United States Patent [19]
Kretschmann

[11] Patent Number: 6,167,464
[45] Date of Patent: Dec. 26, 2000

[54] MOBILE HUMAN/MACHINE INTERFACE FOR USE WITH INDUSTRIAL CONTROL SYSTEMS FOR CONTROLLING THE OPERATION OF PROCESS EXECUTED ON SPATIALLY SEPARATE MACHINES

[75] Inventor: Robert J. Kretschmann, Bay Village, Ohio

[73] Assignee: Rockwell Technologies, LLC, Thousand Oaks, Calif.

[21] Appl. No.: 09/159,450

[22] Filed: Sep. 23, 1998

[51] Int. Cl.[7] .................................................... G06F 13/10
[52] U.S. Cl. ............................ 710/15; 340/825; 340/539; 340/286; 710/15; 710/73; 701/207
[58] Field of Search ..................... 340/825, 539, 340/286; 375/75; 701/207; 56/10.2; 702/182; 710/73, 15

[56] References Cited

U.S. PATENT DOCUMENTS 5,850,187   12/1998   Carrender et al. .................. 340/825.54
5,867,110   2/1999   Naito et al. .............................. 340/995
5,907,491   5/1999   Canada et al. ...................... 364/468.15
5,911,774   6/1999   Itoh ........................................ 701/207
5,950,148   9/1999   Nakagawa et al. ...................... 702/182

*Primary Examiner*—Thomas C. Lee
*Assistant Examiner*—Thu-Huong Vuong
*Attorney, Agent, or Firm*—Keith M. Baxter; John J. Horn; William R. Walbrun

[57] ABSTRACT

A mobile human machine interface for a monitoring operation of a spatially distributed control system in a factory or the like provides a location signal to a central processor holding the control program and relevant I/O data. Based on that location signal, the mobile HMI receives data relevant to the machines near its location. As the user moves through the factory, its location signal changes and the data and program which it executes changes accordingly. The user may identify him or herself to the mobile HMI providing for a second degree of discrimination in the type of data provided to the mobile HMI.

15 Claims, 3 Drawing Sheets

FIG. 3
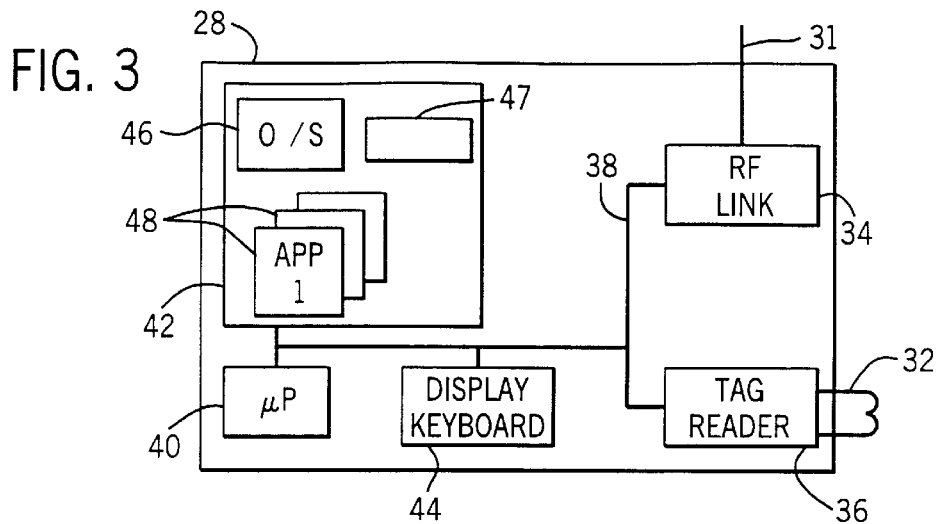
FIG. 4
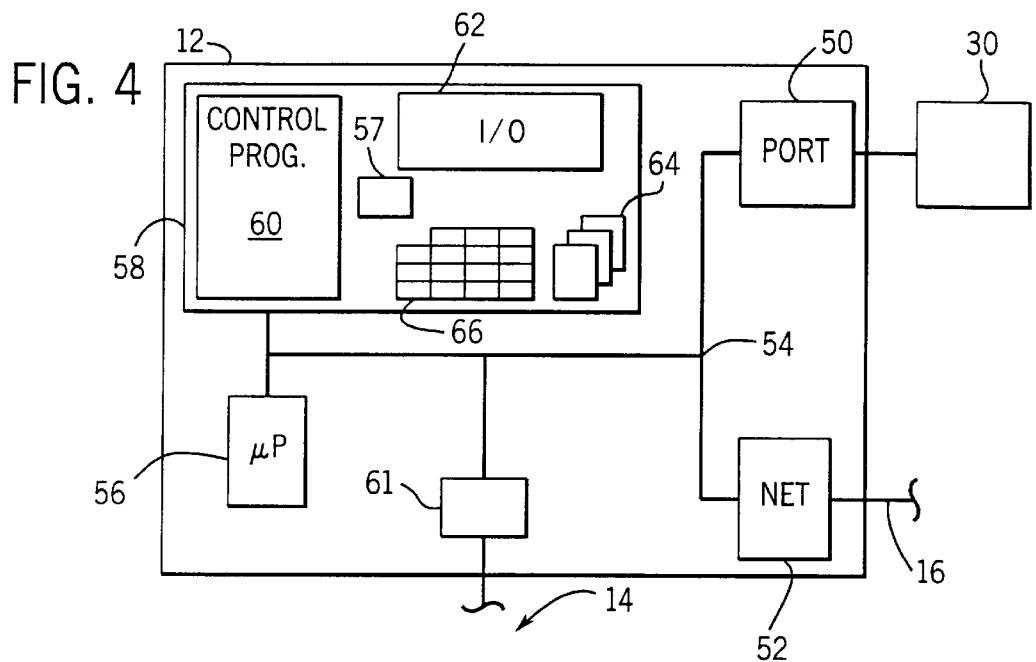
FIG. 5
| | MACHINE 1 | MACHINE 2 | MACHINE 3 |
|---|---|---|---|
| USER 1 | TASK 1 | TASK 2 | TASK 3 |
| USER 2 | TASK 4 | TASK 5 | TASK 6 |
| USER 3 | TASK 7 | TASK 8 | TASK 7 |

MOBILE HUMAN/MACHINE INTERFACE FOR USE WITH INDUSTRIAL CONTROL SYSTEMS FOR CONTROLLING THE OPERATION OF PROCESS EXECUTED ON SPATIALLY SEPARATE MACHINES

CROSS-REFERENCE TO RELATED APPLICATIONS

STATEMENT REGARDING FEDERALLY SPONSORED RESEARCH OR DEVELOPMENT

BACKGROUND OF THE INVENTION

The present invention relates to industrial control systems and in particular to a human/machine interface (HMI) used in an industrial control system.

Industrial controllers are special purpose computers used for controlling industrial processes or manufacturing equipment. Under the direction of a stored program, the industrial controller examines a series of inputs reflecting the status of the control process and changes outputs affecting the control of the process. The inputs and outputs are most simply binary, that is "on" or "off", however, analog inputs and outputs taking on a continuous range of values are also used. The binary inputs and outputs may be represented by single bits of data. The analog inputs and outputs may be represented by multiple bit data words.

In one common architecture for industrial controllers, a central processor executes a control program during which it reads and writes input and output values (I/O) from and to an I/O image table. The I/O image table is a local memory that collects the values of all inputs and outputs of the control system and which can be rapidly accessed without the complex communication protocols needed to exchange data directly with remote I/O modules. Thus, the I/O image table simplifies and speeds the execution of the control program.

Normally, separate circuitry, operating asynchronously to the processor, refreshes the VO image table by communicating with one or more I/O modules in a scanning process. The I/O modules are distributed about a factory to be near the machinery with which they communicate and communicate with the central processor via a high speed network as is known in the art.

The data that characterizes the control process may be displayed at a central location, for example, in a terminal connected to the central processor allowing an operator to monitor the operation of the process. At times, it may be also desirable to have such control data or portions of the control data displayed at various locations throughout the factory. Further it may be desirable to allow operators to input data to the control process from these different locations.

Accordingly it is known to incorporate into the control system a number of remote human/machine interfaces (HMI) to provide for such input and output at various locations about the factory. An HMI may be a simple display providing an indication of the status of the control process, or may be an industrially hardened computer terminal allowing for both the display of more complex types of control data and for the input by the operator of data. Such HMIs include internal programs or received data from a program running on the central processor to provide a local picture of the control process related to the machines near which they are located. Historical data representing the operation of the machine may also be displayed on the HMI.

Installing an industrial control system often requires the preparation of a customized control program and it is typical as the control process evolves that the control program will be modified. For these reasons, it is desirable that the control system include features simplifying the troubleshooting of the control programs. The HMI makes a convenient tool for such troubleshooting and accordingly numerous HMIs may be placed throughout the factory for this purpose so that the different equipment may be observed directly while its portion of the control program is modified or its associated input or output data checked. In this capacity, the HMI aids in the troubleshooting process by providing a limited view of the control data and program associated with the particular machine or group of machines located near the HMI. Thus the engineer performing the troubleshooting or monitoring process may quickly focus in on relevant information.

Ideally, an HMI might be associated with each piece of control equipment for process monitoring and troubleshooting, however this is an inefficient use of resources when the HMI is not needed on a consistent basis. Desirably the number of such devices could be minimized or eliminated while still providing the ability to monitor and troubleshoot the control system when needed.

BRIEF SUMMARY OF THE INVENTION

The present invention provides a portable HMI valuable for use in occasional monitoring or troubleshooting of a control process. Like a conventional HMI, the portable HMI communicates with the central processor to obtain control system data and program information, although it uses a communication link adaptable to mobile operation. Importantly, the portable HMI has the ability to determine its location with respect to the machines in the factory so as to provide the benefit of static HMIs in relaying data to the operator relevant only to the proximate machines.

Specifically, the invention provides an industrial control system for controlling the operation of a process executed on a plurality of separate machines. The control system includes a data network and a plurality of interface circuits providing output signals to the machines and receiving input signals from the machines. An electronic computer communicates with the interface circuits via the data network and executes a control program to read the input signals from the interface circuits and to generate the output signals to the interface circuits based on the input signals and the control program.

The industrial control system further includes a remote link and a portable operator terminal including a terminal output means, such as a display or the like, to provide outputs to a human operator, and a locator means providing a location signal indicating a spatial proximity of the portable operator terminal to a given machine. The electronic computer communicates with the portable operator terminal via the remote link and executes an operator program to provide to the terminal outputs based on the location signal and the operation of the given machine.

Thus it is one object of the invention to provide a portable HMI providing focused information about the control process obtained from the central electronic computer and modified to be relevant to the particular location of the portable HMI.

The terminal outputs may be a representation of the input and output signals associated with the given machine near the portable HMI or may be a representation of a portion of the control program associated with the given machine.

Thus it is another object of the invention to provide a convenient tool for troubleshooting and monitoring a control process that allows an operator to move about the factory environment physically observing the process while having access to data relevant to that particular portion of the process.

The location means may be a proximity detector on the portable HMI such as a bar code reader reading bar codes off of machines or stationary targets, RF detectors or infrared detectors, or may be a manual keypad allowing entry by the operator of a location code or a position location detector (such as a GPS receiver) keyed to a map.

Thus it is another object of the invention to provide the capabilities of the portable HMI described above while minimizing the modification to the control system. The portable HMI eliminates the need for many static HMI units and adds only the requirement of targets distributed throughout the factory environment.

Alternatively, the locator means may be a unique target on the mobile HMI that may be read by a detector located on a stationary device in communicating with the electronic computer. Again, the detection system may be selected from a variety of existing technologies including bar code readers, passive RF tags, infrared detection, and visual pattern recognition devices.

Thus it is another object of the invention to permit a simple construction of the mobile HMI by placing the more complex proximity detection circuitry on stationary devices.

The portable HMI may further include an operator identification means for identifying the operator using the portable HMI means, and the terminal outputs to the portable HMI may be based also on the operator identification. Similarly the portable HMI may identify itself, and the terminal outputs to the portable HMI may be based on the HMI identification.

Thus it is another object of the invention not only to eliminate the need for multiple stationary HMIs but to allow a single or small group of portable HMIs to be used by multiple personnel having different responsibilities within the factory environment. Identification of the operator allows different displays to be provided to different operators, all keyed to a location within the factory.

The foregoing and other objects and advantages of the invention will appear from the following description. In this description, references are made to the accompanying drawings which form a part hereof, and in which they are shown by way of illustration the preferred embodiment of the invention. Such embodiment does not necessarily represent the full scope of the invention, however, and reference must be made therefore to the claims for interpreting the scope of the invention.

BRIEF DESCRIPTION OF THE SEVERAL VIEWS OF THE DRAWINGS

FIG. 3 is a block diagram of the portable HMI of FIGS. 1 and 2 showing a set of internal applications that may be invoked depending on the location of the portable HMI and the identity of its user;

FIG. 4 is a figure similar to that of FIG. 3 showing the elements of the central processor including a memory holding multiple applications that may be invoked to transmit and receive data to and from the portable HMI and holding a user location matrix table;

FIG. 5 is a diagram of a user location matrix of FIG. 4 identifying particular applications to be invoked depending on the location of the portable HMI and the identity of its user;

DETAILED DESCRIPTION OF THE INVENTION

Figure 1:
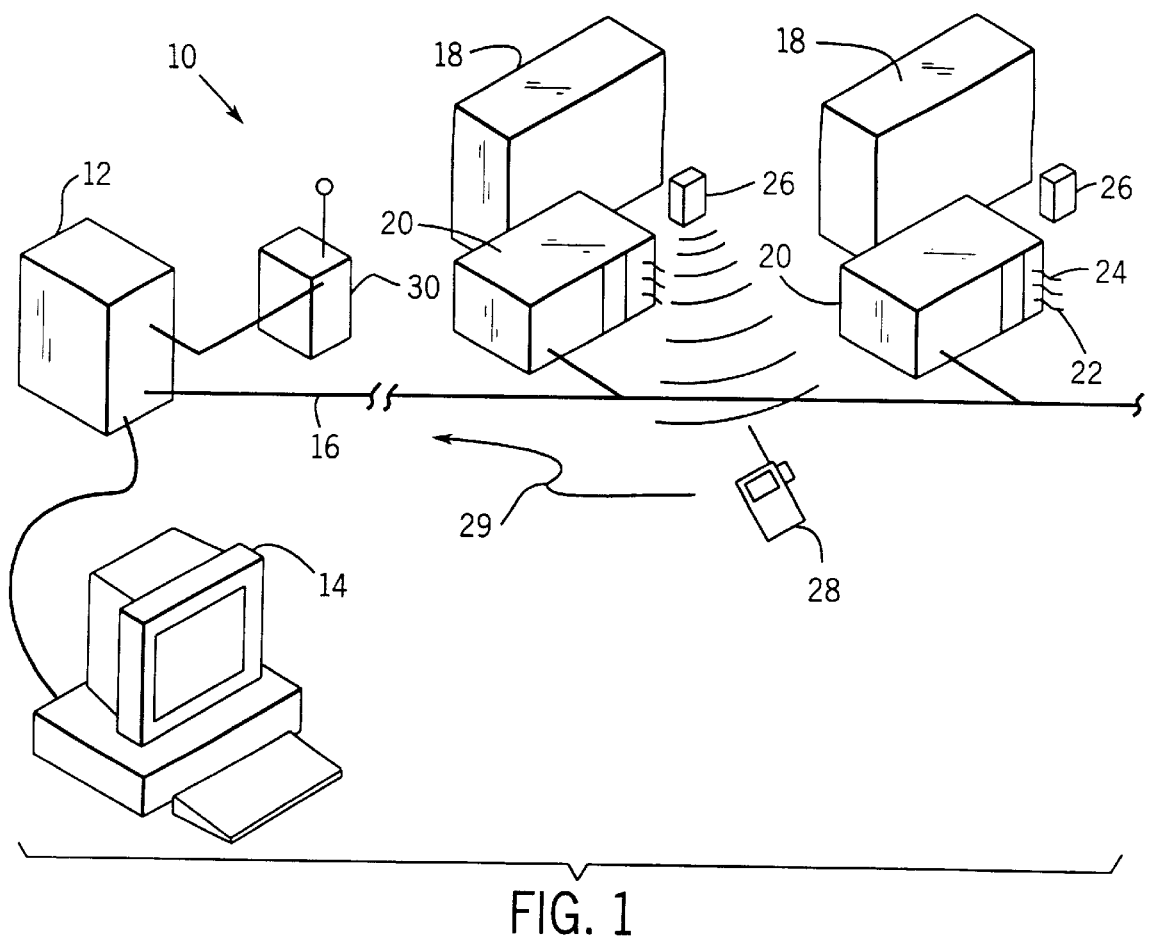
FIG. 1 is a simplified perspective representation of a control system having a central processor and programming terminal and communicating with one or more remote I/O modules associated with particular machines of a factory. The machines have identifying tags that are read by a portable HMI communicating with the central processor via remote link.

Referring now to FIG. 1, an industrial control system 10 includes a central processor 12 communicating with a standard computer terminal 14 and a high speed serial data network 16. The data network 16 runs throughout a factory having a number of machines 18 operating as part of a control process.

Attached along the network 16, in the proximity of the machines 18, are remote I/O modules 20 receiving data from network 16 to provide electrical output signals 22 to control the machines 18. Sensed signals from sensors on the machines 18 are communicated as inputs 24 to the I/O modules 20 and relayed along network 16 to the central processor 12. These components of an industrial control system are well understood in the art and allow a control program executing on the central processor 12 to control and coordinate the machines 18 by means of electrical input and output signals.

In the present invention, each machine 18 is associated with a tag 26 transmitting a unique location code that is read by a portable HMI 28 when it is within the vicinity of the tag 26. The tag may be a passive or active RF tag as is known in the art. As well as reading the tag 26, the portable HMI 28 may communicate with the processor 12 via a radio link with transceiver 30.

Figure 2:
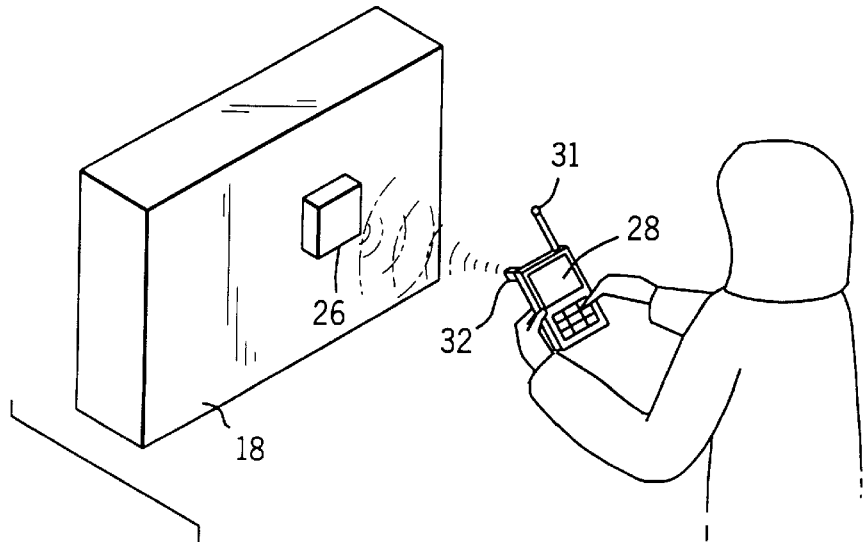
FIG. 2 is a perspective view of an operator using the portable HMI of the present invention near a tagged machine.

Referring now to FIGS. 2 and 3, the portable HMI 28 includes a first radio antennae 31 for communicating with the transceiver 30 via an RF link 29 and a second radio antenna 32 communicating with the tag 26. The first antenna 31 connects to RF link circuitry 34 in the HMI 28, and the second antenna 32 connects to tag reader circuitry 36. Both the RF link circuitry 34 and the tag reader circuitry 36 connect to an internal bus structure 38 of the portable HMI 28 which communicates also with a microprocessor 40, associated memory 42, and a display/keyboard 44 of conventional design.

In the embodiment depicted, the display/keyboard 44 is a liquid crystal graphic display and membrane type push button keyboard. The present invention contemplates, however, a wide variety of different human inputs and outputs as various known technologies mature and can be implemented in a compact form, including tablet-type inputs where a stylus is used to write on a graphic tablet, and other types of graphic displays and voice type interfaces in which the user speaks to the portable HMI 28 and hears synthesized speech in response. This can be particularly useful when the user is interacting with an expert system at the central processor 12 and solutions are transmitted to the HMI 28.

The memory 42 of the HMI 28 holds a compact operating system 46 such as the Windows CE type operating system manufactured by Microsoft Corporation and a variety of application programs 48 whose operation will be described further below.

Referring now to FIG. 4, the central processor 12 includes a port 50 communicating with the RF transceiver 30 so as to provide a bidirectional digital link to the portable HMI 28. The central processor 12 also includes a network port 52 communicating with the network 16 providing a link to the I/O modules 20 described above. An internal bus 54 connects these ports 50 and 52 to a processor system 56 such as may include one or more microprocessors communicating with memory 58 and via port 61 to terminal 14 also described above.

The memory 58 holds a control program 60 and an I/O table 62, the latter of which stores an image of all inputs and outputs communicated between the processor 12 and the I/O modules 20 and thus provides a snapshot of the state of the control process. The I/O table 62 also includes static parameters indicating initialization values used by the control program. As is conventional, the control program reads input values and static parameters from the I/O table 62 and through its internal logic generates output values that are written to the I/O table 62. The network port 52 asynchronously updates the I/O table 62 communicating values between itself and the I/O modules 20.

As is understood in the art, the data values and parameters of the I/O table 62 are segregated as to the particular machines 18 to which they relate. This segregation may be done on the basis of the machine location and hence its address. Alternatively, the segregation may be derived from a data structure created by the user and associating particular I/O data and parameters with a particular machine. The control program 60 is divided into portions related to particular machines by identifying those portions of the control program making reference to I/O values previously segregated.

The memory 58 also includes a number of programs that may be invoked to provide data and communicate with a portable HMI 28, for example, to display particular I/O data of I/O table 62 or particular portions of the control program 60. Each program together with pointers to its argument data will be considered a task 64. In the prior art, a task 64 would be affiliated with a stationary HMI unit to provide the data and accept data from that particular stationary HMI possibly in a particular predetermined format.

The memory 58 also includes a user/machine matrix 66 shown also in FIG. 5. This matrix 66 identifies one or more tasks 64 to a particular user and a particular machine 18. Through this matrix 66, for example, a first user and first machine are associated with a task 1, whereas a first user and a second machine are associated with a task 2. Likewise, a second user and first machine are associated with task 4. Alternatively, but not shown, the matrix 66 may match an HMI type to one or more tasks as an additional dimension of the matrix 66 or as an alternative to user and machine types shown. In this way data communicated with the HMI may be tailored to the capabilities of its hardware.

Referring now to FIGS. 1, 2, and 3, in operation, a user carries the portable HMI 28 near a machine 18 associated with a location tag 26. Location information from location tag 26 is received by the second antenna 32 and the tag reader 36 of the portable HMI 28 and relayed via bus 38 to the microprocessor 40. The microprocessor 40 executing the background HMI program 47 relays this information via the RF link circuitry 34 in the antennae 31 to the transceiver 30 associated with the central processor 12. Optionally, the user may also enter an identification code through the display/keyboard 44 which may also be transmitted to the central processor 12 via the RF link circuitry 34. The HMI program may include a unique code identifying the HMI 28 for purposes as will be described below.

Referring now to FIGS. 4 and 5, the processor 12 receives the location data from the tag 26 and the user identification code through the transceiver 30 where it is transmitted to the processor system 56 under the control of the HMI service program 57. If only information from the tag 26 is available, the user matrix 66 will only have column information and not row information, and the column associated with the particular machine identified by the tag 26 will be referred to and a task identified making an assumption of a default user, in this case user 1. The particular task 64 will then be executed to transmit to the portable HMI 28 the necessary I/O or control program information associated with that particular machine 18 identified and the task selected by the matrix 66. Alternatively, the default user may be associated with an "empty" task causing not data to be transmitted to the HMI, effectively requiring proper user identification prior to use of the HMI. In the more typical case, both the user and the machine will be identified and specific task executed as listed in the matrix 66. As mentioned above, one of the dimensions of the matrix 66 may be an HMI identification causing a task tailored to the hardware capabilities or other qualities of the HMI to be transmitted.

Referring again to FIG. 3, the received data may be received at the HMI 28 by the RF link circuitry 34 of the portable HMI 28 where it is read by the HMI program 47 to provide displays on the display of the display/keyboard 44.

Likewise, information entered on the display/keyboard 44 may be relayed to the task 64 of the central processor 12 via the RF link 29.

As is understood in the art and in order to conserve bandwidth on the RF link, portions of the task 64 may be loaded into the portable HMI 28 as the applications 48 after a task has been identified.

Figure 8:
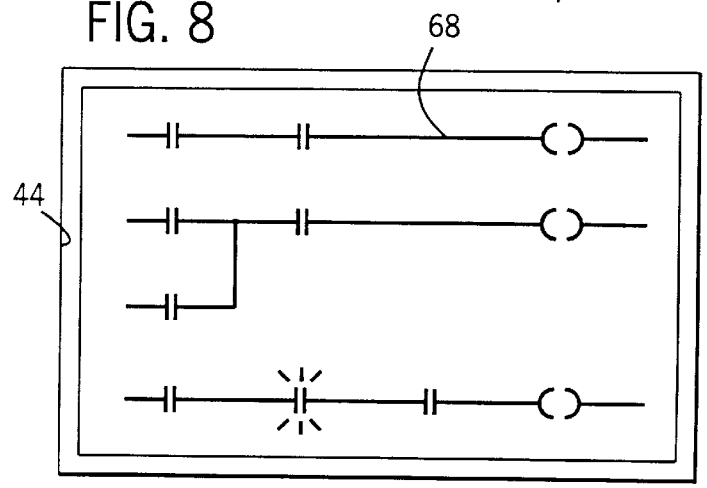
FIG. 8 is a representation of a portion of a control program as may be displayed on the HMI as a function of the location of the HMI.

Referring now to FIG. 8, the display of the display/keyboard 44 may, for example, show a portion of a ladder-logic representation 68 of control program 60 associated with the particular machine 18 near the portable HMI 28. Portions of the ladder-logic representation 68 may be highlighted to indicate the status of various inputs and outputs to and from the machine 18. The operator standing in the proximity of the machine 18 may thus confirm the status of these inputs and outputs, thereby monitoring and troubleshooting possible problems with the control program.

Figure 6:
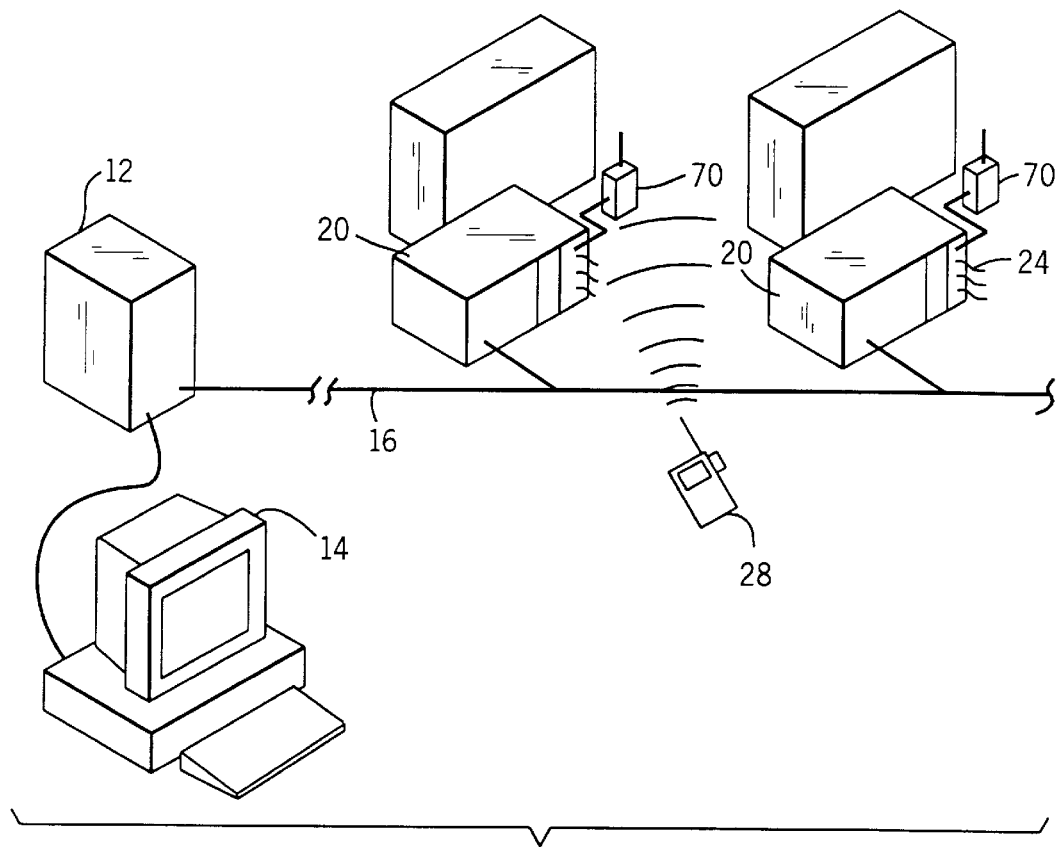
FIG. 6 is a figure similar to that of FIG. 1 showing an alternative embodiment where the remote link employs part of the data network used to communicate input/output data to the machines of the factory eliminating the need for a separate long range communication channel between the HMI and the central processor.

Referring now to FIG. 6, it will be understood that the key to the tailoring of the operation of the portable HMI 28 to a particular machine 18 requires simply an identification of the location of the portable HMI 28 and that identification may be obtained in a number of ways including through use of global positioning signals, well understood in the art, or even manual input by the user. Alternatively, other technologies including bar-code readers reading bar codes on the machines, or image recognition systems viewing similar symbols, or low-powered infrared links or magnetic fields from localized transmitters may be used to provide the HMI 28 with an indication of its location.

Figure 7:
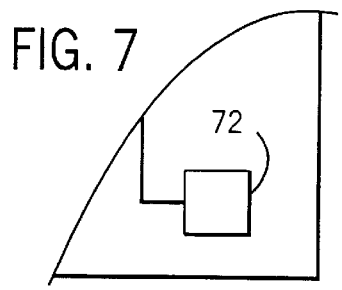
FIG. 7 is a fragmentary detail view of FIG. 3 showing a generic position locating means as may be used with the present invention.

Further it will be recognized that the sensing device for location may in fact be placed in a stationary location to detect and identify a portable HMI 28 marked as to its identity. A priori knowledge of the location of the sensing device and the identify of the HMI 28 thereby establishes the location of that portable HMI 28. Thus as shown in FIG. 6 a stationary detector 70 reads a signal broadcasted by the portable HMI 28 both providing identification of the portable HMI 28 and serving to communicate data as is normally reserved for the RF link 29 described with respect to FIG. 1. The detector 70 may detect both types of data and may communicate with the I/O module 20 through the network 16 to the central processor 12. In this way the power of the RF link may be substantially reduced (or it may be replaced with a short distance communication medium such as infrared) and communication between the central processor 12 and the portable HMI 28 may be primarily on the data network 16 with open air RF communication being minimized. Referring to FIG. 7 then, the tag reader 36 may be considered a general location identification system 72 incorporating any one of these known technologies.

In an alternative embodiment, that will be understood from the above description, the HMI 28 may hold no application programs 48, but instead, upon identification of the HMI 28 by the central processor 12, the central processor 12 may identify one or more applications (using a matrix 66) to be downloaded to the HMI. The user may identify one application and whether the downloaded application will be temporary or permanent depending on whether he or she will need it again, or the identification may be reserved to the central processor 12. In this way the HMI 28 is simplified and made more flexible for different uses.

The above description has been that of a preferred embodiment of the present invention. It will occur to those that practice the art that many modifications may be made without departing from the spirit and scope of the invention. In order to apprise the public of the various embodiments that may fall within the scope of the invention, the following claims are made.

We claim:

1. An industrial control system for controlling the operation of a process executed on a plurality of spatially separate machines that interact to execute the controlled process, the control system comprising:

a data network;

a plurality of interface circuits providing output signals to the machines and receiving input signals from the machines;

an electronic computer communicating with the interface circuits via the data network and executing a control program to read the input signals from the interface circuits and to generate the output signals to the interface circuit s based on the input signals and the control program so as to control the process;

a remote link;

a portable operator terminal including:
   (i) terminal output means for providing a terminal output to a human operators wherein the terminal output indicates a portion of the control program associated with a given machine;
   (ii) a locator means producing a location signal indicating a spatial proximity of the portable operator terminal to the given machine;

the electronic computer further communicating with the portable operator terminal via the remote link and executing an operator program to provide the terminal outputs based on the location signals and the operation of the given machine. therefore.

2. The industrial control system of claim 1 wherein the terminal outputs indicate at least one of the group selected from input and output signals of the given machine.

3. The industrial control system of claim 1 wherein the locator means is a proximity detector detecting the proximity and identity of a stationary target and selected from the group consisting of a bar code reader, an RF detector, and infrared detector, a manual keypad, and electronic camera.

4. The industrial control system of claim 1 wherein the locator means is a unique target for a proximity detector on a stationary device having a known location and communicating with the electronic computer, the target selected from the group consisting of a bar code, an RF tag, an infrared emitter, and visual pattern.

5. The industrial control system of claim 1 wherein the locator means is a global positioning system receiver.

6. The industrial control system of claim 1 wherein the terminal outputs are selected from the group consisting of alphanumeric text, images and audible speech.

7. The industrial control system of claim 1 wherein the operator terminals also receive terminal inputs from the human operator and wherein the electronic computer also responds to the terminal inputs to produce the terminal outputs.

8. The industrial control system of claim 7 wherein the terminal inputs are selected from the group consisting of alphanumeric text, cursor position signals and spoken voice commands.

9. The industrial control system of claim 1 wherein the portable terminal further includes an operator identification means and wherein the terminal outputs are also based on the identification of the operator.

10. The industrial control system of claim 1 wherein the portable terminal further includes an HMI identification means and wherein the terminal outputs are also based on the identification of the HMI.

11. The industrial control system of claim 1 wherein the remote link is selected from the group consisting of a radio link to the electronic computer and a radio link to the data network.

12. The industrial control system of claim 1 wherein the portable operator terminal includes memory holding an application program and wherein the electronic computer further communicates with the portable operator terminal via the remote link to down load an application program to the memory of the portable operator terminal.

13. The industrial control system of claim 12 wherein the application program is determined by the electronic computer based on at least one of the group consisting of an identification of the portable operator terminal, an identification of a user of the portable operator terminal and the location signal.

14. An industrial control system for controlling the operation of a process executed on a plurality of spatially separate machines that interact to execute the controlled process, the control system comprising:

a data network;

a plurality of interface circuits providing output signals to the machines and receiving input signals from the machines;

an electronic computer communicating with the interface circuits via the data network and executing a control program to read the input signals from the interface circuits and to generate the output signals to the interface circuits based on the input signals and the control program so as to control the process;

a remote link;

a portable operator terminal including:
- (i) terminal output means for providing a terminal output to a human operator;
- (ii) a locator means producing a location signal indicating a spatial proximity of the portable operator terminal to a given machine;
- (iii) a memory holding an application program, wherein the electronic computer further communicates with the portable operator terminal to download an application program to the memory of the portable operator terminal, and wherein the application program is determined by the electronic computer based on at least one of the group consisting of an identification of the portable operator terminal, an identification of a user of the portable operator terminal and the location signal;

the electronic computer further communicating with the portable operator terminal via the remote link and executing an operator program to provide the terminal outputs based on the location signals and the operation of the given machine.

15. The industrial control system of claim 14, wherein the terminal output indicates a portion of the control program associated with the given machine.

\* \* \* \* \*